March 19, 1946.　　　F. M. RODDY　　　2,396,752
METHOD FOR DISSOLVING ORGANIC SOLIDS WITH ORGANIC LIQUIDS
Filed Feb. 23, 1942　　　3 Sheets-Sheet 1

INVENTOR
FRED M. RODDY
BY
W Russell Greenwood
ATTORNEY

March 19, 1946. F. M. RODDY 2,396,752
METHOD FOR DISSOLVING ORGANIC SOLIDS WITH ORGANIC LIQUIDS
Filed Feb. 23, 1942 3 Sheets-Sheet 3

INVENTOR
FRED M. RODDY
BY
W. Russell Greenwood
ATTORNEY

Patented Mar. 19, 1946

2,396,752

UNITED STATES PATENT OFFICE 2,396,752

METHOD FOR DISSOLVING ORGANIC SOLIDS WITH ORGANIC LIQUIDS

Fred M. Roddy, Providence, R. I.

Application February 23, 1942, Serial No. 431,972

5 Claims. (Cl. 106—198)

This invention relates to a process for bringing into solution organic materials that are difficult to dissolve with each other, and in particular, for bringing an organic solid into solution with an organic liquid. The process is particularly directed to the treatment of the various organic compounds employed in plastics and their solvents and plasticizers. An immediate application of the invention is for the purpose of plasticizing or plasticating the organic compounds employed in thermoplastic molding materials. In this instance these compounds do not absorb the liquid plasticizers very readily and the materials are difficult to force into solution with each other by the methods at present employed for this purpose. This invention relates to a less difficult and a more ready means of bringing such materials into solution with each other; still other applications will be brought out as the specification continues.

As to certain materials that should lend themselves to the practice of my process, I mention cellulose acetate, cellulose acetate butyrate, ethyl-cellulose and the various liquid plasticizers with which these materials are combined to form molding compounds. To this list may be added the vinyl compounds as the vinyl-acetyl, vinyl-chloride, vinylidene chloride, etc. The polyamide compounds, which are known by the trade name of "Nylon," may also be included in the list. Certain of the elastomers belonging in the synthetic rubber class may be entered in this list.

In addition to the plasticating process in which solid organic materials are forced into solution with liquid plasticizers, the invention is applicable to the treatment of "dopes" in the form of a viscous mass which consists of organic solids in solution with comparatively ready solvents for these materials. Though these compounds may be rather readily soluble in the said liquid solvents, such compounds generally contain a small percentage of material which resists solution and this material appears as haze in the resulting "dopes." My invention may be employed to force such materials into solution, thereby eliminating the haze. The application of the invention for the purpose of clarifying "dopes" is analogous to the plasticating operation previously described but the chemical and physical nature of the materials involved is different.

The foundation of my invention is the process of bringing into solution materials that are difficult to dissolve with each other by causing a flowable mixture or dispersion of the materials to be dissolved to pass through, or be pumped through orifices or restricted passages wherein a terrific amount of pressure is dissipated. The said pressure dissipation as the material passes through the restricted apertures produces violent agitation in the mixture and generates considerable heat, thereby increasing the temperature of the flowing materials. My invention enables the high temperature and agitation to be accomplished in a manner not heretofore practiced. The combined effect of the turbulence produced and the elevated temperature caused by the friction generated in the turbulent flowing mixture brings about complete solution of the dissoluble materials.

It is to be emphasized that by virtue of the fact that the material is subjected to a very sudden rise in temperature during pressure dissipation, the actual upper limit of temperature that may be obtained is higher than is practical by contact methods of heating. This is true because contact methods of heating are slow, due to the relatively poor conductivity of such materials, and the total time necessary to subject the material to high temperature before it can be completely heated and cooled is much longer by contact means of heating than by the means represented in my invention. In my process the organic compounds may be momentarily subjected to temperatures at which they are unstable and would decompose chemically if held at such temperatures for an appreciable length of time. Since, however, the heating is accomplished almost instantaneously, and cooling of the materials to a temperature at which they become stable may be rather promptly effected, very high momentary temperatures at which the dissolving action takes place may be accomplished. Under this condition of high temperature and violent turbulence and agitation of the material, the dissolving action produced is very efficient.

In carrying out the plasticizing operation according to my process, the materials may be subjected momentarily to a temperature higher than is the case when the material is worked on rubber type mills or kneading machines as is present practice. The process, however, is so rapidly carried out and the materials subjected to the high temperatures for such a short interval of time that the process is less "heat rough" on the materials being processed than is the case in the above mentioned older methods of plasticating thermoplastic compounds.

The above will be clear when it is explained that no very definite temperature can be named at which organic compounds of this class will undergo decomposition or chemical deterioration because the time to which the material is exposed to the given temperature is an important factor. Thus, a plastic material might undergo serious deterioration if held at about 400 degrees Fahrenheit for thirty minutes, but the same material might undergo no apparent injury if held at about 500 degrees Fahrenheit for five seconds.

The heating effect that may be produced by causing the dissipation of a high pressure in the flowing material will be illustrated by an example which will presently follow. The suddenness with which the temperature of the material is increased gives this method of heating advantage over the older contact means of heating, and at the same time an unprecedented turbulence or agitation of the material is produced. The following example will illustrate the method of computing the amount of temperature rise when a flowing material passing through a restricted region or regions is subjected to a given pressure dissipation. In this example it is assumed that all the heat dissipated goes into the material to be rendered plastic and that none of the heat is conducted away by the metallic surfaces and dissipated elsewhere:

Assume the pressure at the entrance of the restricted region to be 20,000 pounds per square inch. Then the energy dissipated per cubic inch of material passing through the restricted aperture or apertures will be 20,000 inch pounds or 1,666.66 foot pounds of energy. Dividing this figure by 778 (the mechanical equivalent of heat) the quotient will then be 2.14 B. t. u.'s, which represents the amount of heat generated per cubic inch of material passing through the restricted points. If the density of the resin material to be injected is .05 pounds per cubic inch and the specific heat is 0.4, the total amount of temperature rise will be $2.14 \div .05 \div 0.4$ which equals 107 degrees F.

The following is a specific example in which the plasticating process is carried out: Assume that an organic solid, cellulose acetate, is to be worked into solution with a suitable liquid plasticizer for the said material in order to produce a molding compound that will be in the form of a hard solid material at room temperature but will become plastic at elevated temperatures, say 300–350 degrees Fahrenheit.

As ordinarily produced in the chemical process of manufacture, cellulose acetate is in the form of tiny hard particles of the order of size that would pass through a twenty or thirty mesh screen. These particles are quite hard and liquid plasticizers do not readily penetrate the solid acetate material. In present methods of manufacture, the plasticizer is worked into the material by mixing the said materials and kneading them in rubber type mills or other mixing machines while subjecting the materials to an elevated temperature in the neighborhood of 300 degrees Fahrenheit or somewhat higher. Even under these conditions, the plasticizer works into the material very slowly and the final product often contains white specks which consist of particles of the acetate that have not become thoroughly plasticized. In order to insure complete plasticizing of the material, it is manufacturing practice either to grind the cellulose acetate to a very fine mesh or to soften the larger particles of material with acetone, a more ready solvent for the acetate, before subjecting the material to the plasticizing process.

Both the grinding process and the method of adding acetone to the material to produce softening of the particles are costly and undesirable auxiliary steps now employed in the manufacture of cellulose acetate molding compounds. One of the purposes of my invention is to eliminate these auxiliary steps, and as will later be described, to insure better and more uniform quality of the finished products.

As regards the quality and uniformity of plastic molding compounds, one of the difficulties of present manufacturing methods is that plasticizer evaporates and escapes from the hot material during the mixing or kneading process and results in non-uniformity of the different batches of material insofar as flow characteristics are concerned. If two batches of material are mixed or kneaded for the same length of time at the same temperature, the product of the two batches should of course be the same. In reality, however, this is hard to control and it is difficult to produce several batches of material all having the same flow characteristics.

Compare the foregoing method of plasticizing cellulose acetate with a suitable liquid plasticizer with the means by which the process is accomplished in the present invention. In the process of this invention solid cellulose acetate in flake form will be mixed with a liquid plasticizer. The percentage of the solid material will be predominant and the resulting mixture will be in the form of moist acetate material rather than in a tacky or plastic state. This previously mixed cellulose acetate and plasticizer will be preheated in a suitable heating chamber to a moderately plastic state in which the plastic mass will contain a considerable portion of thoroughly plasticized material and yet a great many hard particles of cellulose acetate which resist solution will remain. This mass will then be pumped by means of a pump capable of delivering tremendous pressure, preferably of the type described in my co-pending application, Serial No. 439,634; filed April 20, 1942, entitled "Pump for plastic, doughy, pasty or viscous materials, now issued as Patent No. 2,367,691 of January 23, 1945, to a pressure dissipation valve wherein a controlled amount of pressure is dissipated. During pressure dissipation the hard particles of acetate material will become completely disintegrated and thoroughly dissolved, as previously explained, by the combined effect of the elevated temperature and turbulence produced as the material passes through the restricted region of the device.

After leaving the pressure dissipation valve device the material will be led through suitable dies for extruding into strands and pass downwardly through a cooled stack or cabinet wherein the cooling action hardens the strands. Thence the strands will be led to a suitable chopping machine which will cut them up into short lengths forming material of particle size suitable for injection molding or fashioning operations. Of course, if desired, the material plasticated in this operation could be led directly to the fashioning operation without going through the process of producing hardened strands and chopping them into small pellets which would be later re-plasticized in a fashioning operation as injection molding or extrusion. The necessity for re-plasticizing would thus be eliminated.

It will be noted that the process of my invention is a continuous one and that the previously described shortcomings of the older batch methods of preparing such materials will be obviated.

It is to be further noted that in this process the system is entirely enclosed and plasticizer cannot escape from the material during the working operation.

Aside from the process of plasticating the commonly known thermoplastic materials used for molding compounds, it has previously been explained that the process of the present invention may also be employed for the purpose of clarifying "dopes." In this case the apparatus involved will be different in that the "dope" will usually be flowable and may be led from a supply tank or other vessel to the pump without the necessity of a preheating operation. From the pump the "dope" mixture would pass to the pressure dissipation valve device wherein a controlled amount of pressure will be dissipated and thence the material will be led through a cooled pipe or other cooling unit to bring the "dope" to room temperature. This treated or clarified "dope" material will then be collected in a suitable vessel for use in subsequent spinning or fashioning operations.

In the previously described applications of my invention the solutions produced will usually be physical solutions, that is, no chemical change will take place during the dissolving process. The distinctions between physical and chemical solutions of organic materials are not always entirely clear and this process may be used to aid in bringing about chemical solutions as well as physical solutions.

Referring to the drawings which illustrate several forms of the invention,

Figure 1:
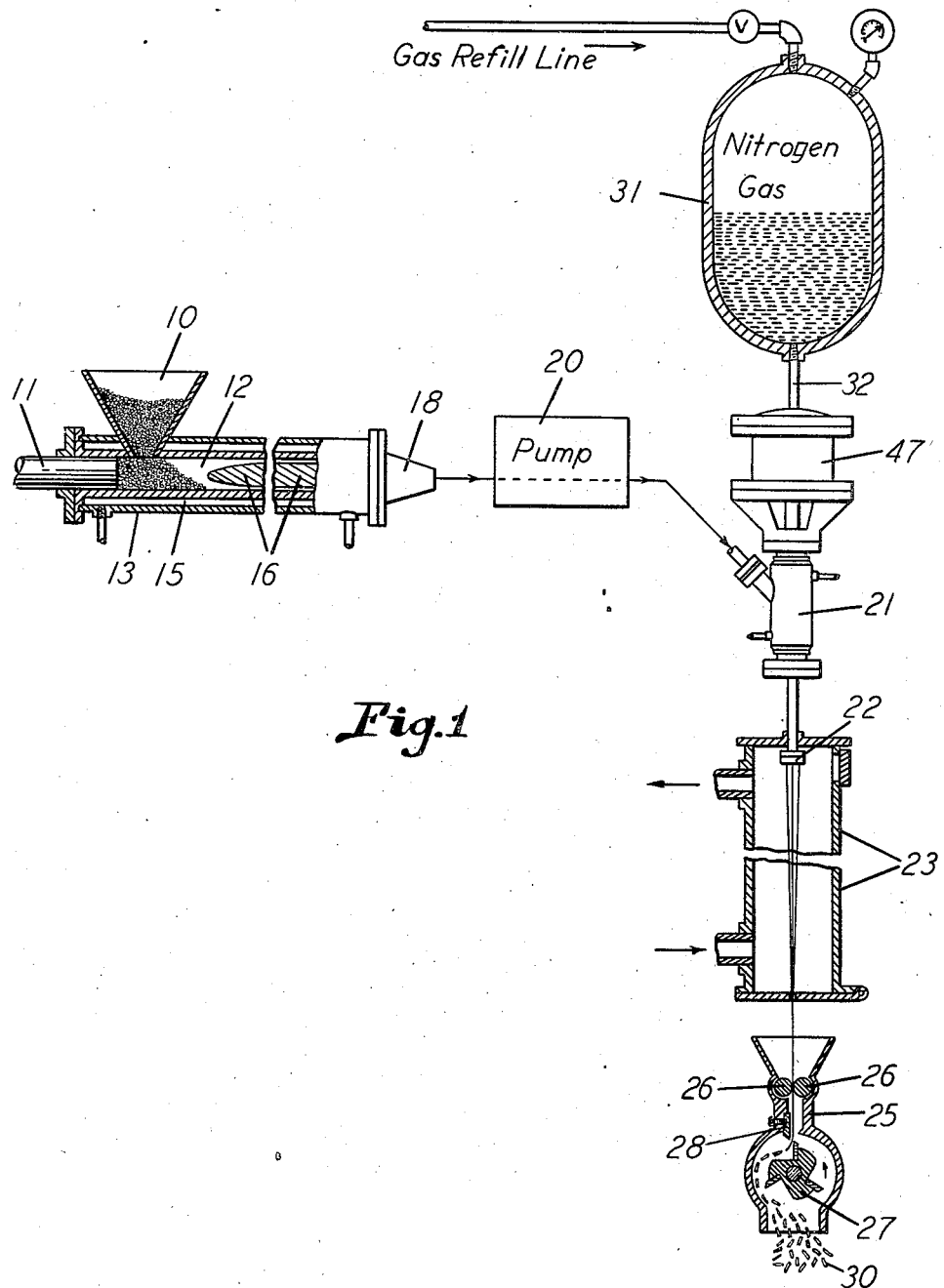
Fig. 1 is a diagrammatic view of one form of practicing the invention.

Referring to Fig. 1 of the drawings one form of apparatus is shown diagrammatically for practicing my invention and as illustrated it consists of an arrangement of cooperating devices for the production of extruded strands from solutions of solid particles dissolved to form a plastic mass according to the invention, which strands are subsequently cut up into short lengths for use as a molding compound. In the hopper 10 a mixture of solid particles of an organic composition ordinarily difficult to get into solution, and a liquid plasticizer is introduced, the solid matter predominating and being in either granular, flake, or powdered form. The reciprocable ram 11 is then forced inwardly of the heating chamber 12 which is of suitable length for properly preheating the material, and the forward movement of this ram forces the mixture introduced into the chamber 12 from the hopper 10 into the zone of the chamber 12 which is heated, through the heating jacket 13 that is heated by appropriate means, such as by a heating medium flowing through the channel 15 about the heating chamber 12 or by means of electrical coils or other known heating arrangements. The compressed material then arrives at the position of the heating chamber 12 where dividing of the advancing mass begins, indicated in this figure by the torpedo 16 which is tapered at its front end and at which portion it first engages the forwardly moving material compressed by the ram 11. As illustrated, the torpedo 16 is disposed axially of the heating chamber 12 in spaced relationship to the inner wall thereof so that material passing through this section of the heating chamber is shaped in the form of a hollow cylinder whose walls are relatively thin in order to enable the heat to better penetrate through them as the material advances forward of the heating chamber and enters the nozzle 18 at the exit end of the heating chamber. In other words, the torpedo 16 serves to spread the compressed material into thin sections thereby facilitating heating.

The compression ram 11 is retracted, a second charge of the mixture drops into the inlet zone of the heating chamber 12, and the ram 11 is then forced inwardly of the heating chamber 12 whereby the newly introduced mixture follows the same path through the heating chamber as previously described and the previously introduced mixture which is already moderately plastic is forced forward of the torpedo 16 and out of the heating chamber through nozzle 18 from which the moderately plastic material issues in a flowable but not melted condition and passes into the pump 20. In this figure I have illustrated the pump diagrammatically; however, the preferred form of pump which I proposed to employ is the high pressure streamline flow pump construction disclosed and claimed in my application, Serial No. 439,634; filed April 20, 1942, entitled Pump for plastic, doughy, pasty or viscous materials, now issued as Patent No. 2,367,691 of January 23, 1945.

From the pump 20 the plastic mass is forced into the pressure dissipation valve device 21 where the moderately plastic material is heated to a high temperature by the dissipation of a controlled amount of pressure to increase the temperature of the material to that at which it becomes completely plastic.

The soft, easily flowable extruded material as it issues from the orifice of the pressure-dissipation valve device 21 is forced through the extrusion die 22 disposed within the vertical stack or cabinet 23. The extruding strand or strands from the die 22 then are caused to pass downwardly through the stack or cabinet 23 where they are conditioned by the temperature conditions therein to produce a hardened strand or strands suitable for cutting or chopping upon issuing from the stack or cabinet as, for example, by being drawn into a rotary cutting or chopping machine 25 by the feed rolls 26 thereof and severed by the action of the rotary knives 27 with the fixed knife 28 to produce small-sized pellets 30 of thermoplastic molding materials. Cool air is circulated through the stack or cabinet 23 to harden the strand or strands.

Figure 2:
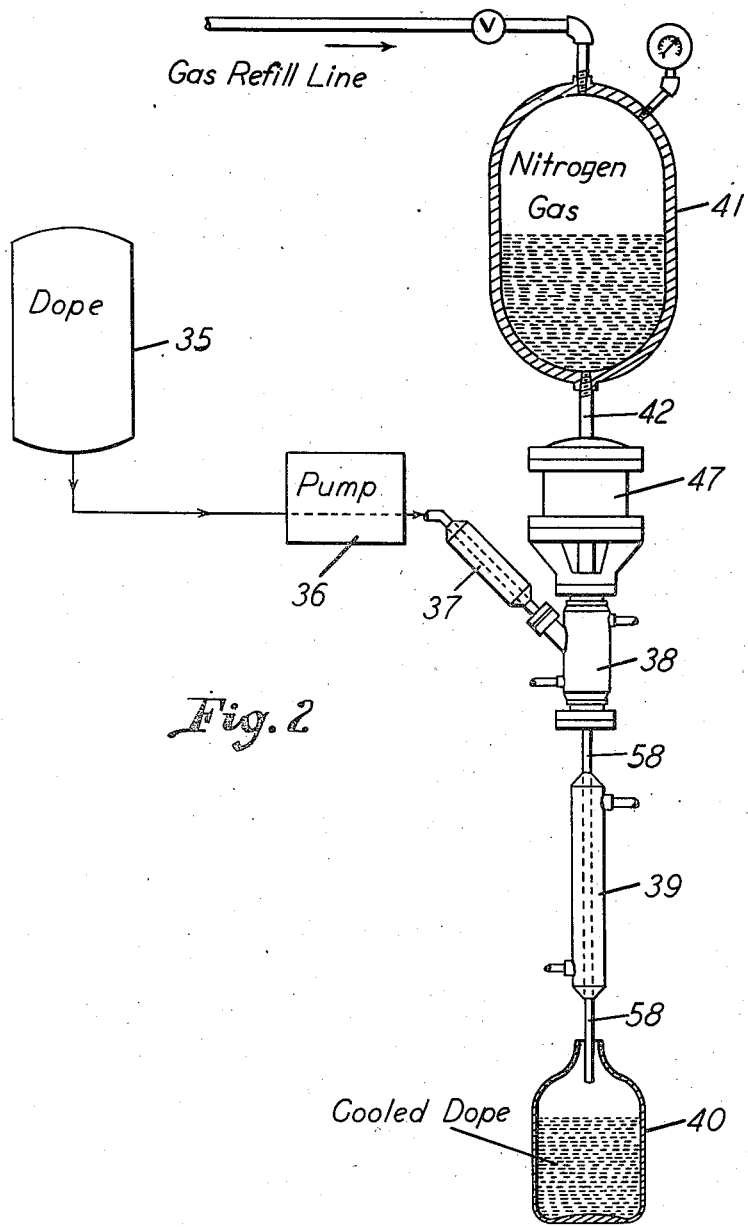
Fig. 2 is a diagrammatic view of a second form of practicing the invention.

In Fig. 2 there is illustrated diagrammatically another form of apparatus for practicing my invention for clarifying "dopes" or dispersions containing a certain percentage of solid materials that resist solution thereby causing a haze. In the tank 35 a "dope" to be clarified is stored. This "dope" is pumped from tank 35 by pump 36 through preheating unit 37 and thence to the pressure dissipation valve device 38, and in being forced through the device 38 the material is subjected to extrusion through an orifice or stricture in this device in which a fixed and controlled amount of pressure is dissipated resulting in a given rise in temperature sufficient to bring all the solid particles into complete solution thereby eliminating the "haze" and clarifying the said "dope" material. From the pressure dissipation valve device 38 the extruding material is forced through pipe 58 and caused to pass through the jacketed section 39 thereof where the material is conditioned by the temperature conditions maintained by the jacket to cool the "dope" mass to room temperature, after which the cooled mass is collected in a suitable vessel or receptacle 40. The preheating unit 37 is shown as being provided with a suitable heating jacket whereby a heating medium may be circulated, or other well-known heating means may be employed.

In the embodiments depicted in Figs. 1 and 2, hydraulic fluid via lines 32 or 42 from tanks 31 and 41 respectively under pressure of a suitable gas therein serves to actuate the valve in the pressure dissipation valve devices 21 or 38 which control the pressure to be dissipated therein. As will be indicated hereinafter in the description of the pressure dissipation valve device "per se" the pressure to be dissipated is proportional to the gaseous pressure acting upon the fluid in tanks 31 and 41 and therefore it may be set at will by adding or removing gas from these tanks.

The streamline flow pumps 20 and 36 are of the positive type and capable of developing a very high pressure. The actual pressure developed is automatically controlled by the pressure-dissipation valve devices 21 and 38 respectively. The pressure to be dissipated is proportional to the gaseous pressure acting upon the fluid in the tanks 31 and 41 respectively, and therefore may be set at will by adding or removing gas from said tanks. The construction and functioning of the pressure dissipation valve devices 21 and 38 will be explained now.

The pressure dissipation valve devices 21 and 38 are similar and the description of the structure of one will suffice for the other. Thus, in Figs. 3, 4 and 5 I have illustrated one form of pressure dissipation valve device 21 and 38 respectively, each of which devices has the construction shown in Fig. 3 consisting of a piston 45 mounted on the upper end of the plunger 46 and slidable in the cylinder 47 mounted on one end of the valve device 48, the piston 45 and plunger 46 being normally urged downwardly in the cylinder 47 by fluid under high pressure from the partly gas and partly fluid filled tanks 31 or 41. This downward movement of the piston 45 causes the plunger 46 to be pressed down in the cylinder 50 of the pressure dissipation valve device. The plastic mass or the "dope" as the case may be is introduced by pumps 20 or 36 through the oblique conduit 51 in the side wall of the cylinder 50 and via pipe 52 into the filling space 53 around the lower end portion of the plunger 46.

It will be noted that the pressure exerted by the plastic mass or the "dope" in the space 53 tends to force the plunger 46 upwardly thereby removing the conical end 55 of the plunger 46 from its conical seat 56 in the orifice member 57 and allowing the plastic material or the "dope" to flow through the valve and outwardly from the exit opening thereof through the pipe 58 which leads to the extrusion die 22 in the apparatus shown in Fig. 1, and in the arrangement shown in Fig. 2 the pipe 58 conducts the flowing material through the jacketed member 39. It will be seen that a throttling action is thus produced and that the pressure dissipated in the flowing plastic mass as it passes through the pressure-dissipation valve device 21 or 38 may be regulated by controlling the pressure within the space 60 above the piston 45. The pressure in the space 60 is of course the same as the pressure in the tanks 31 or 41 respectively.

Figures 3, 4, 5:
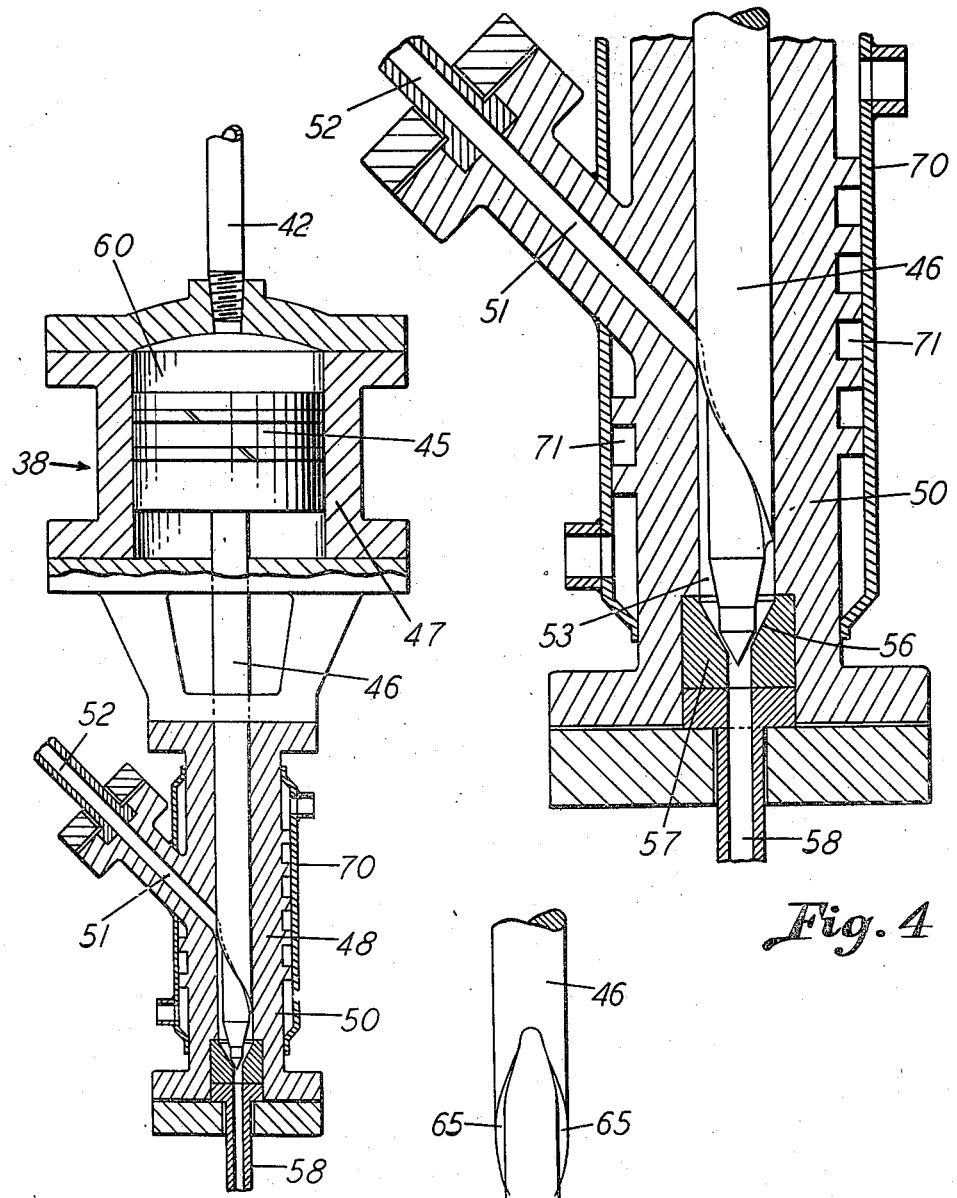
Fig. 3 is a side elevational view partly in section of the automatic pressure dissipation valve device according to the invention.
Fig. 4 is a fragmental view on enlarged scale of the lower portion of the valve shown in Fig. 3 showing the construction of the pressure dissipation portion of the valve in detail.
Fig. 5 is an enlarged view of the lower portion of the valve plunger of the pressure dissipation valve device.

As shown in Fig. 5 the plunger is profiled to provide symmetrical tapered end portions 65 spaced well back from the conical end 55 for the purpose of producing the filling space 53 around the plunger and causing the dividing of the plastic mass or dope, as the case may be, about the plunger as it is introduced into the cylinder 50 from conduit 51. It will be noted that this construction permits streamline flow through the valve devices 21 or 38 and that there are no "dead" places where material can collect or lodge and be injured by its long contact with heated surfaces of the device. Also, the valve is self-cleaning and permits the following of one color after another without dismantling of the valve for cleaning.

It will be obvious that the plunger 46 could be loaded by means of a spring instead of the hydraulic cylinder 47 and piston 45 and associated hydraulic system including tanks 31 and 41. While the spring loading method is simpler it is less sensitive. The means illustrated is therefore preferable.

The cylinder 50 has double walls and is heated by the heating jacket 70 which in turn is heated by suitable medium flowing through the space 71 thereby serving to maintain the temperature of the material flowing through the cylinder 50.

It will be understood that in each of the foregoing embodiments of the invention, all pieces of mechanism and all passages of the system through which the material flows should be so designed that a streamline flow of the material occurs and there are no places in which material can collect or become lodged and remain in or become stagnant in the system long enough to be injured by heat from metallic surfaces with which it contacts. The system will thus be self-cleaning.

It will be seen that I have provided a novel means whereby materials that are difficult to dissolve may be forced into solution with each other and that the said novel means or method is applicable for the purpose of plasticating plastic compounds by forcing them into solution with their plasticizers, and also for the purpose of clarifying "dopes" by forcing small percentages of material that resist solution into solution with the remainder of the "dope" mass thereby eliminating "haze" in the "dope."

Furthermore, in accordance with my invention, the production of a product of uniform quality is made simpler because the process is continuous and the system is entirely enclosed making it impossible for plasticizer to escape. It will be seen that uniform conditions of manufacture are easily maintained at all times.

Aside from the foregoing applications of bringing about physical solutions my invention may be employed to effect chemical solution or to aid in producing chemical reactions within a mixture of organic substances in a flowable form.

I claim:

1. Process for bringing into solution organic solids with an organic liquid comprising the steps of preheating a mass containing a quantity of the organic solid material in intimate association with a lesser percentage of an organic liquid to a temperature high enough to cause the organic solids to become moderately plastic but below any temperature at which injury or decomposition of the material will result, then forcing the preheated mass through an orifice or stricture wherein a terriffcally high pressure is dissipated thereby suddenly generating great heat and violent turbulence within the flowing material whereby the combined effect of the high temperature and the violent turbulence generated will effect complete solution of the said organic solids with the organic liquid.

2. Process for producing a solution of an organic solid material with a plasticizer comprising the steps of providing a mixture of an organic solid material or relatively small particle size to which has been added a quantity of a suitable liquid plasticizer, preheating this mixture to a temperature high enough to cause the organic solid particles to become moderately plastic but below any temperature at which injury or decomposition of the material will result, then forcing the preheated mass through an orifice or stricture wherein a terrifically high pressure is dissipated thereby suddenly generating great heat and violent turbulence within the mass whereby the combined effect of the high temperature and violent turbulence will cause disintegration and complete solution of the solid particles of organic material with the plasticizer.

3. Process for producing a solution of an organic solid material with a plasticizer comprising the steps of providing a mixture of an organic solid material of relatively small particle size to which has been added a quantity of a suitable liquid plasticizer, preheating this mixture to a temperature high enough to cause the organic solid particles to become moderately plastic but below any temperature at which injury or decomposition of the material will result, then forcing the preheated mass through an orifice or stricture wherein a terrifically high pressure is dissipated thereby suddenly generating great heat and violent turbulence within the mass and controlling the amount of pressure dissipated as the mass passes through said orifice or stricture whereby the combined effect of the high temperature and violent turbulence will cause disintegration and complete solution of the solid particles of organic material with the plasticizer.

4. Process for producing a solution of solid particles of cellulose acetate with a liquid plasticizer comprising the steps of providing an intimate mixture of solid cellulose acetate of relatively small particle size to which has been added a quantity of a suitable liquid plasticizer, preheating the mixture of plasticized solid acetate material to a temperature high enough to cause the solid acetate particles to become moderately plastic but below any temperature at which injury or decomposition of the material will result, then forcing the preheated plastic mass through an orifice or orifices wherein terrific pressure is dissipated thereby suddenly generating great heat and violent turbulence within the flowing mass whereby the combined effect of the high temperature and violent turbulence will cause disintegration and complete solution of the said solid particles of cellulose acetate with the liquid plasticizer.

5. Process for producing a solution from a dispersion of organic solids in an organic liquid comprising the steps of providing a dispersion of organic solids in an organic liquid, preheating and forcing said preheated dispersion through an orifice or stricture wherein a terrific pressure is dissipated thereby suddenly generating great heat and violent turbulence within the flowing material as it passes through said orifices or stricture whereby the combined effect of the high temperature and violent turbulent movement of the stream of material tends to disintegrate and solubilize the solid particles of material and form a homogeneous solution.

FRED M. RODDY.